United States Patent [19]

Moritz

[11] Patent Number: 4,672,805
[45] Date of Patent: Jun. 16, 1987

[54] GUIDE CHAIN FOR GUIDING ENERGY LINES

[75] Inventor: Werner Moritz, Siegen, Fed. Rep. of Germany

[73] Assignee: Kabelschlepp Gesellschaft mit beschränkter Haftung, Siegen, Fed. Rep. of Germany

[21] Appl. No.: 832,815

[22] Filed: Feb. 21, 1986

[30] Foreign Application Priority Data

Mar. 1, 1985 [DE] Fed. Rep. of Germany ....... 3507200

[51] Int. Cl.[4] ............................................. F16G 13/16
[52] U.S. Cl. ..................................... 59/78.1; 59/900; 248/49
[58] Field of Search ................... 59/78.1, 900; 248/49, 248/51, 52, 78

[56] References Cited

U.S. PATENT DOCUMENTS

| | | | |
|---|---|---|---|
| 3,330,105 | 7/1967 | Weber | 59/78.1 |
| 4,084,370 | 4/1978 | Moritz | 59/78.1 |
| 4,104,871 | 8/1978 | Moritz | 59/78.1 |
| 4,392,344 | 7/1983 | Gordon | 59/78.1 |
| 4,570,437 | 2/1986 | Moritz | 59/78.1 |

FOREIGN PATENT DOCUMENTS

| | | |
|---|---|---|
| 1273952 | 7/1968 | Fed. Rep. of Germany ........ 248/51 |
| 7624623 | 8/1976 | Fed. Rep. of Germany . |
| 2622006 | 3/1978 | Fed. Rep. of Germany . |
| 2708193 | 9/1978 | Fed. Rep. of Germany . |
| 3318365 | 11/1984 | Fed. Rep. of Germany . |
| 61175 | 6/1966 | German Democratic Rep. . |
| 1502283 | 3/1978 | United Kingdom . |

*Primary Examiner*—Robert L. Spruill
*Assistant Examiner*—David B. Jones
*Attorney, Agent, or Firm*—Becker & Becker, Inc.

[57] ABSTRACT

A guide chain for guiding energy lines, with the guide chain being disposed between a fixed connection and a movable consuming device. The guide chain includes a plurality of interconnected chain link members, each of which is a one-piece, inherently stable, U-shaped receiving member having two legs that are connected by a crosspiece and that form the links of the chain link member. Each of the chain link members is provided with a stop to limit the two-way pivot angle of adjacent interconnected ones of the chain link members. Each link of a given chain link member has a first end connected to the crosspiece, and a second end. A respective holding element is disposed on each second end of each link of a given chain link member. Each holding element projects inwardly toward the other link of that chain link member. A flexible cover strip is retained between the holding elements in a self-supporting manner for spanning the open portion of each chain link member. Each holding element can be a projection that is either provided with a slot for receiving a cover strip, or that is provided with undercuts for receiving widened edge beads of the cover strip.

5 Claims, 6 Drawing Figures

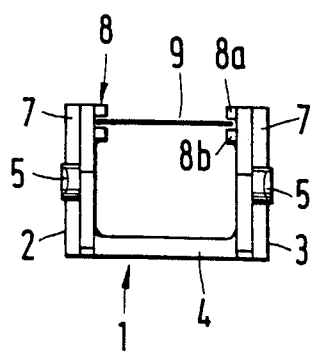
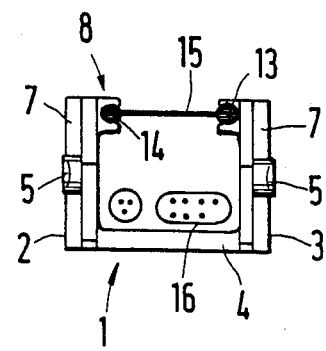
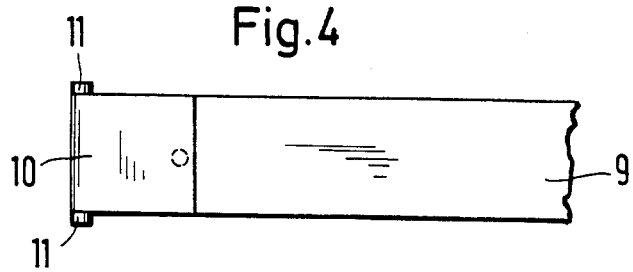
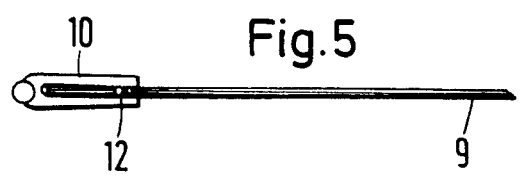
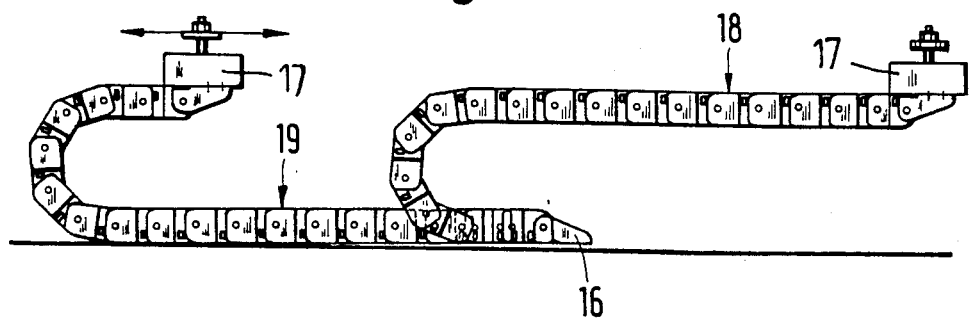

GUIDE CHAIN FOR GUIDING ENERGY LINES

BACKGROUND OF THE INVENTION

1. Field of the Invention

The present invention relates to a guide chain for guiding energy lines. The guide chain is disposed between a fixed connection and a movable consuming device. The guide chain includes a plurality of interconnected chain link members, each of which comprises a one-piece, inherently stable, U-shaped receiving member having two legs that are connected by a crosspiece and that form the links of the chain link member. Each of the chain link members is provided with stop means to limit the two-way pivot angle of adjacent interconnected ones of the chain link members.

2. Description of the Prior Art

German Offenlegungsschrift No. 33 18 365, corresponding to U.S. Pat. No. 4,570,437 to Moritz dated Feb. 18, 1986 and belonging to the assignee of the present invention, discloses a guide chain of the aforementioned general type where each chain link member comprises a one-piece, inherently stable, U-shaped receiving member having two legs that form the links of the chain link member. In addition, each chain link member of this heretofore known guide chain comprises a locking bracket or guard that can be connected to the free edges of the links. The guard is connected to one of the links via a hinge joint, and can be locked with the other link via an elastic hook. These heretofore known guide chains have proven themselves in practice. However, in order to replace or exchange energy lines, it is necessary to individually open all of the locking guards and then to again close them.

German Auslegeschrift No. 26 22 006, corresponding to U.S. Pat. No. 4,104,871 to Moritz dated Aug. 8, 1978 and belonging to the assignee of the present invention, discloses a guide chain that has separable intermediate elements that comprise at least two flanges or straps having flattened cross sections and rounded-off narraw sides, as well as separating webs disposed therebetween. The upper and lower ends of the separating webs are provided with undercuts so that straps, after having been placed into the recesses, can be frictionally and positively connected with the separating webs by rotating the straps about their longitudinal axes. With this heretofore known guide chain, clamps are provided between the links and the intermediate webs in order to be able to insert a cover strip. The problem with this known guide chain is that in order to be able to replace or exchange individual energy lines, the cover strip must first be removed, and then all of the intermediate webs have to opened and subsequently again closed.

An object of the present invention is to provide a closed guide chain for energy lines that has a simple contruction, and that can be rapidly opened and again closed for replacing or exchanging the energy lines.

BRIEF DESCRIPTION OF THE DRAWINGS

This object, ond other objects and advantages of the present invention, will appear more clearly from the following specification in conjunction with the accompanying schematic drawings, in which:

FIG. 2 is a cross-sectional view through one chain link in which is inserted a flat cover strip;

FIG. 3 is a cross-sectional view through a chain link having a cover strip inserted therein that is provided with edge beads;

FIG. 4 is a plan view of one end of a cover strip;

FIG. 5 is a side view of the end of the cover strip shown in FIG. 4; and

FIG. 6 is a side view of one inventive embodiment of a guide chain disposed between a fixed connection and a movable consuming device.

SUMMARY OF THE INVENTION

Figure 1:
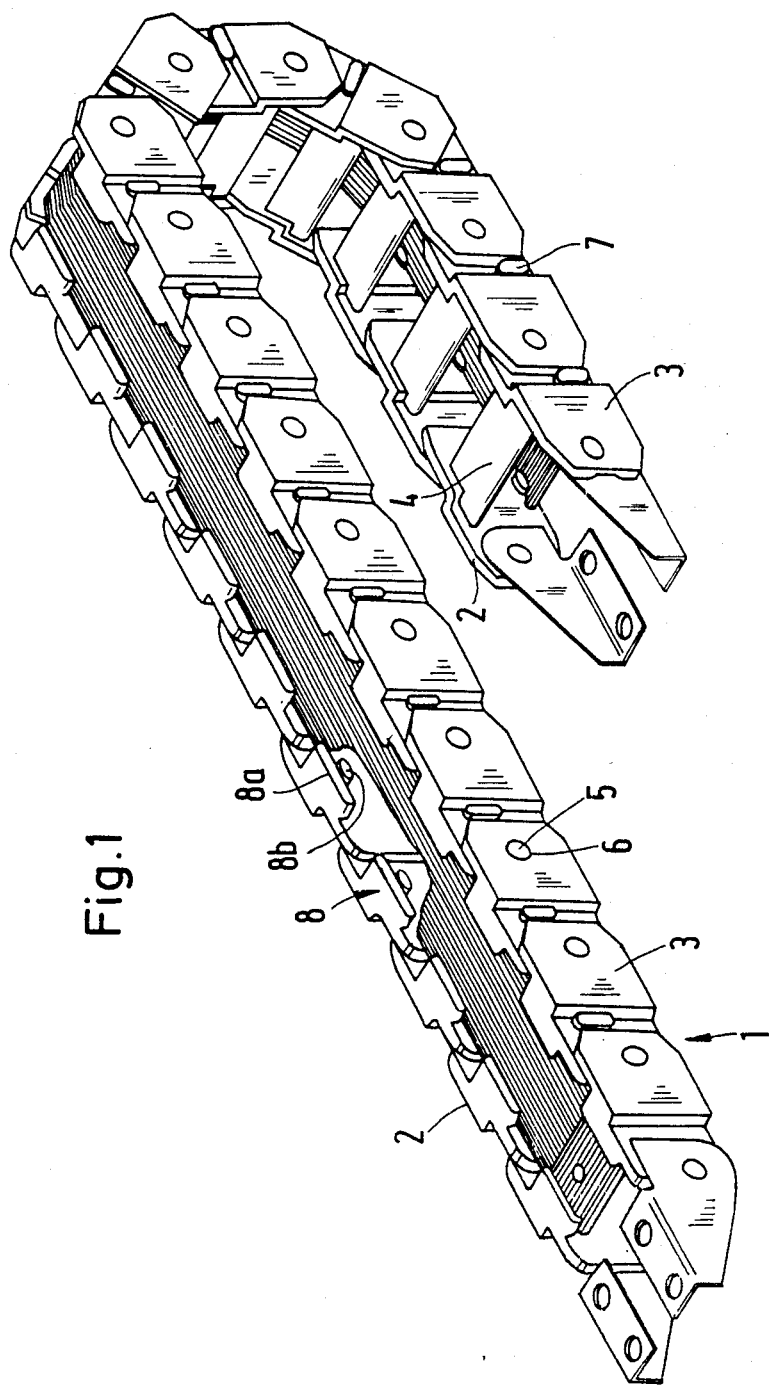
FIG. 1 is a view of one inventive embodiment of a guide chain for guiding energy lines, with the cover strip in place.

The guide chain of the present invention is characterized primarily in that each link of a given chain link member has a first end connected to the crosspiece, and a second end, with a respective holding element being disposed on each second end; each of these holding elements projects inwardly toward the other link of that chain link member; a flexible cover strip is retained between the holding elements in a self-supporting manner for spanning the open portion of each chain link member.

Each of the holding elements can be a projection that is provided with a slot for receiving the cover strip. Alternatively, each holding element can be a projection that is provided with undercuts for receiving widened edge beads of a cover strip.

In order that during proper usage of the guide chain the cover strip cannot slide out of the holding elements in the longitudinal direction, it is proposed that removable end pieces be disposed at the beginning and end of a cover strip. These end pieces can, for example, comprise a spring clip having holding projections that extend beyond the width of the cover strip and that can be supported on the holding elements of the first and last chain links.

A guide chain constructed pursuant to the present invention has the advantage that after the end piece at one end of the cover strip has been removed, the cover strip can be pulled out of the guide chain at the other end. After individual ones of the energy lines, or all of the energy lines, have been replaced or exchanged, it is just as easy to again introduce the cover strip into the holding elements, and to again slightly prestress the cover strip by attaching the removed end piece. In this way, when the guide chain moves, the cover strip cannot become disengaged from the holding elements. It is not conceivable how a simpler guide chain can be provided that is closed but can nevertheless be opened.

Further advantageous features of the present invention will be described subsequently.

DESCRIPTION OF PREFERRED EMBODIMENTS

Referring now to the drawings in detail, each chain link comprises a capital U-shaped receiving member 1, the legs of which are embodied as links 2, 3, and are interconnected by a crosspiece 4. The ends of the links 2, 3 are flexible, so that the individual chain links can be pushed together to form a link chain, whereby pivot journals 5 engage in pivot holes 6. The front of the pivot journals 5 is inclined. Disposed between the links 2, 3 of adjacent chain links are stops 7 to limit the two-way pivot angle.

Disposed on the free ends of the links 2, 3 are inwardly projecting holding elements 8. In the embodiment illustrated in FIGS. 1 and 2, these holding elements 8 comprise a wider outer projection 8a and a narrow inner projection 8b. In this way, the holding elements 8 form inwardly open slots in which is inserted a flexible, planar cover strip 9 of plastic or metal.

The cover strip 9 spans the opening of the chain links in a cantilever or self-supporting manner. End pieces 10 of the cover strip 9 serve only to prevent the latter from slipping out, and do not effect a prestressing. Each end piece 10 comprises a spring clip having holding projections 11 that extend beyond the width of the cover strip 9. These holding projections 11 are supported by the holding elements 8 of the first and last chain link. The end pieces 10 with a slit are pushed or shifted onto the cover strip 9 and engage with a rod or pin 12 formed integrally thereon fitted into a hole in the cover strip 9.

In the embodiment illustrated in FIG. 3, the holding elements 8 are provided with an inwardly open undercut 13 in which is inserted a cover strip 15 that is provided with edge beads 14. This embodiment is utilized when the U-shaped receiving member 1 has long legs as the links 2, 3. The beads 14 prevent the links 2, 3 from springing apart.

The diagrammatic view of FIG. 6 shows the inventive guide chain disposed between a fixed connection 16 and a movable consuming device 17, such as the support of a machine tool. Since the stops 7 limit the two-way pivot angle of the chain links, the upper side 18 of the guide chain can be self-supporting, whereas the lower side 19 can extend over a predetermined radius of curvature.

The present invention is, of course, in no way restricted to the specific disclosure of the specification and drawings, but also encompasses any modifications within the scope of the appended claims.

What I claim is:

1. A guide chain fo guiding energy lines longitudinally and laterally thereof, with said guide chain being disposed between a fixed connection and a movable consuming device; said guide chain comprises:
   a plurality of interconnectable chain link members, generally extending longitudally in the direction of movement of said mobable device, each link member is comprised of a one-piece, rigid, U-shaped receiving member having two legs that are connected by a crosspiece and that collectively therewith form an open sided chain link;
   each of said legs of each chain link member is provided on one longitudnal end with pivot journals and on an opposite longitudinal end with pivot holes onto which the pivot journals of an adjacent link member engage to form the guide chain said guide chain having a predetermined two-way pivot angle of adjacent ones of said chain link members;
   each of said legs of each said chain link member being provided adjacent said pivot journals a stop means to limit the two-way pivot angle of adjacent interconnected ones of said chain link members each comprised of two portions; said legs of a given chain link member having a first portion connected generally of a right angle to said crosspiece, and second portion extending outwardly from said first portion away from said crosspiece to a terminal end;
   a respective holding element disposed at said terminal end of each of said links of a given chain link member; each of said holding elements projecting inwardly toward the other facing leg of that chain link member; and
   a flexible cover strip that is retained between said holding elements in a self-supporting manner for covering the open side of each of said U-shaped receiving members of said chain link members.

2. A guide chain according to claim 1, in which each of said holding elements is a projetion that is provided with a slot for receiving an edge of said cover strip.

3. A guide chain according to claim 1, in which said cover strip is provided with widened edge beads; and in which each of said holding elements is a projection that is provided with undercuts for receiving one of said edge beads of said cover strip.

4. A guide chain according to claim 1, in which said cover strip is provided with two ends, on each of which is removable disposed an end piece.

5. A guide chain according to claim 4, in which each of said end pieces comprises a spring clip having holding projections that extend beyond the width of said cover strip.

* * * * *